(No Model.)
N. C. MITCHELL.
PROCESS OF RECOVERING RUBBER FROM WASTE.
No. 395,987. Patented Jan. 8, 1889.
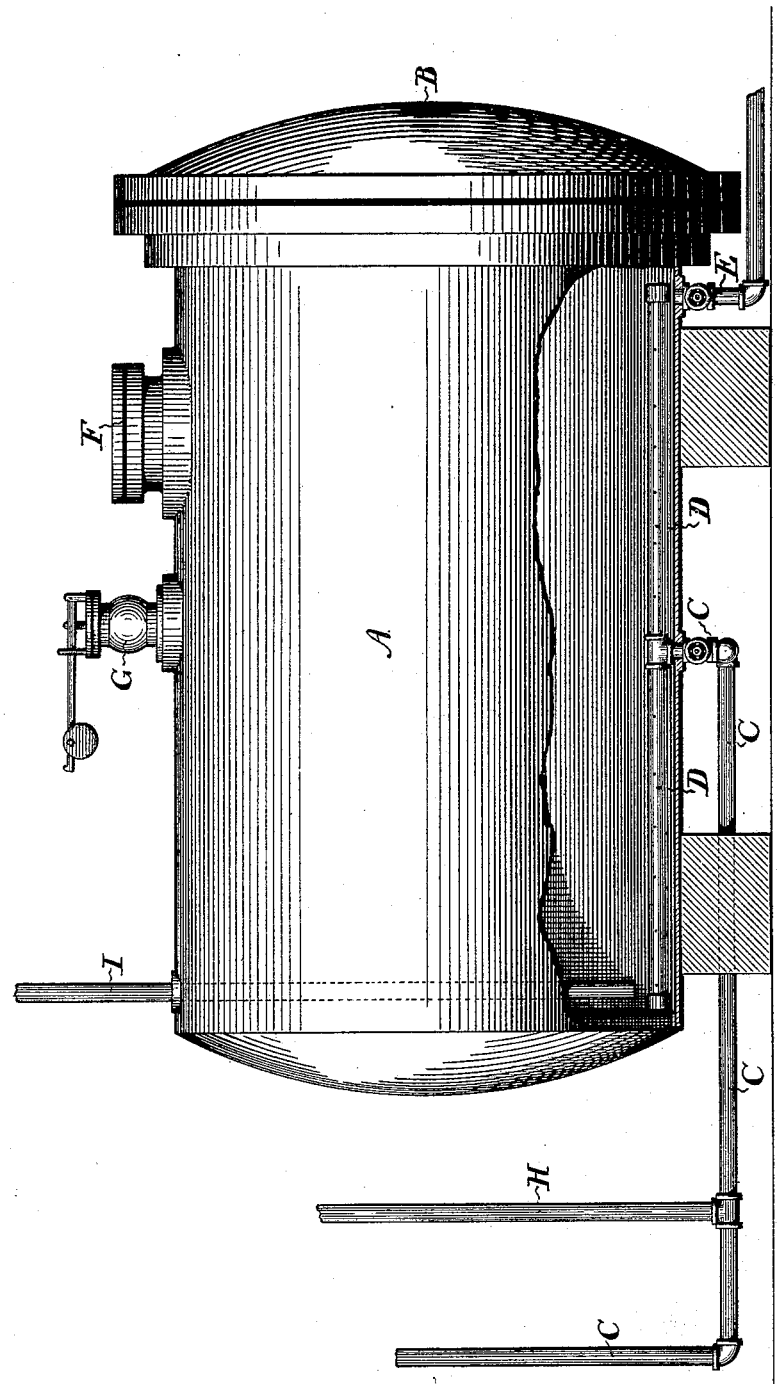
WITNESSES:
A. E. Paige
J. H. Bell
INVENTOR.
N. Chapman Mitchell,
By Hollingsworth & Haley
Attorneys

UNITED STATES PATENT OFFICE.

NATHANIEL CHAPMAN MITCHELL, OF PHILADELPHIA, PENNSYLVANIA.

PROCESS OF RECOVERING RUBBER FROM WASTE.

SPECIFICATION forming part of Letters Patent No. 395,987, dated January 8, 1889.

Application filed December 7, 1886. Serial No. 220,939. (No specimens.)

*To all whom it may concern:*

Be it known that I, NATHANIEL CHAPMAN MITCHELL, of Philadelphia, in the State of Pennsylvania, have invented certain new and useful Improvements in the Process of Recovering Rubber from Waste, whereof the following is a specification.

This invention relates to the reclamation of rubber from waste in a form capable of reuse.

Rubber waste usually consists of scraps or refuse cuttings incidental to the manufacture of rubber goods, and also of the manufactured goods themselves in a worn-out condition. It is composed, in general, of rubber, sometimes vulcanized, sometimes unvulcanized, according to the source, mixed with animal or vegetable fiber—such, for example, as woolen or cotton fabric—and with mineral compounds, such as salts of lime, lead, zinc, and aluminium. Heretofore many processes have been devised for reclaiming the rubber by subjecting the waste to the action of reclaiming reagents—such as solutions of caustic alkalies or of acids, which act upon the fibrous matters, and in some cases also upon the mineral compounds—so as to form products which can be washed out, leaving the rubber in a more or less pure condition. Among the most successful of these processes is that of my patent, No. 300,720, dated June 17, 1884, in which the rubber waste is boiled in sulphuric or hydrochloric acid. In this, as in all other processes known to me, the treatment of the rubber waste with the reclaiming agent has been carried on at the atmospheric pressure and practically requires the use of solutions containing a very large proportion of acid, in order that they may have sufficient strength to act upon the foreign matters in a reasonable time. It is also objectionable, particularly with hydrochloric acid, on account of the large quantity of acid vapors which escape when the solution is heated.

I have discovered that great advantages are secured by heating the reclaiming agent and the rubber waste together in a close vessel under pressure above the ordinary boiling or vaporizing point of the solution employed as such agent, and that under such elevated temperature and pressure the reclaiming agent acts more energetically than when the operation is performed under atmospheric pressure, so that weaker solutions, and consequently less acid, may be employed and a more rapid corrosion effected, while at the same time the rubber is less affected and can be recovered in a better condition, as well as at less expense.

In practically carrying the invention into effect if the waste contains woolen fiber, I use for each one hundred (100) pounds of waste about fifteen to twenty-five (15 to 25) pounds of commercial hydrochloric acid or about five to ten (5 to 10) pounds of sulphuric acid of 66° Baumé in excess of the quantity requisite to combine with the decomposable mineral compounds in the waste. If the waste contains only cotton fiber, the quantity requisite to combine with the mineral compound will suffice, or a less quantity if it is not desired to remove the mineral compound. The quantity requisite to combine with the mineral compound can be ascertained for hydrochloric acid by burning a sample and estimating the ash as carbonate of lime, of which in the majority of cases it principally consists. Thus for each pound of ash seventy-one one-hundredths (0.71) pound of the hydrochloric-acid gas, or about two and thirteen one-hundredths (2.13) pound of commercial acid of 1.16° specific gravity, would suffice. With sulphuric acid less than the chemical equivalent would suffice, as much of the mineral compound remains undecomposed.

I place the waste in a vat and add the acid mixed with enough water to cover the waste—say enough water to make two hundred (200) pounds of the dilute acid to one hundred (100) pounds of waste. I then close the vat and heat the mixture to, say, about two hundred and forty degrees (240° F) Fahrenheit, (more or less,) and keep it at that temperature until the fibrous ingredient is sufficiently corroded to be removed by washing, which heating operation may occupy some fifteen to thirty minutes, more or less. Those skilled in reclaiming rubber waste will know from examining a sample when the waste has been sufficiently treated, and if on examination it is found to require further treatment the heating can be continued with or without the addition of acid.

I find that the strength of the acid solution, the temperature and pressure, and the time are dependent, more or less, on one another. Thus, for example, a solution of greater strength will require a less temperature and pressure in order to effect the desired result in the same time, and will at the same temperature effect the result in a less time, while a solution of less strength will require a higher temperature and pressure in order to effect the desired result in the same time and a longer time in order to effect it at the same temperature.

In treating unvulcanized waste, which usually contains sulphur, it is not advantageous to raise the temperature so high as to cause vulcanization.

A considerable portion of the mineral compounds escapes decomposition with sulphuric acid, and even with hydrochloric acid not all of them are decomposed before the fiber is corroded, especially if the latter is easily attacked. Of course less acid is required to recover rubber free from fiber where undecomposed mineral matter remains in the waste; and of course, also, where the fiber is first attacked the operation can be continued in order further to decompose the remainder of the mineral compounds.

The vat should not be of lead nor lead-lined, since lead is attacked by the acids, and the salt formed promotes vulcanization; but use can be made of copper vessels, or preferably copper vessels coated inside with a paint which is formed by melting together over a direct fire thin tar mixed with ten to twenty per cent. (10% to 20%) of naphtha and about ten per cent. (10%) of hard rubber. The vat may be heated in any suitable way.

The accompanying drawing, which forms part of this specification, is a side elevation, partly broken away, of an apparatus which may conveniently be employed.

A represents a cylindrical vessel of copper having a removable head, B. This vessel should be of sufficient strength to resist an internal pressure of, say, one hundred and twenty pounds. At the bottom of the vessel an injection-pipe, C, for steam enters and is provided with a perforated discharge, D, which extends nearly the entire length of the vessel. The vessel is also provided with a blow-off pipe, E, at the bottom, and an inlet-pipe, I, for acid, a man-hole, F, and a safety-valve, G, at the top. A water-pipe, H, connects with the steam-pipe C, so that when desired water instead of steam can be introduced through the perforated discharge D. The pipes C, E, H, and I are provided with suitable cocks, and the pipes C and E are connected, respectively, with steam and water supply.

The vessel being filled with waste ground fine, the outlets are closed and the acid solution is run through the pipe I. After charging the vessel and closing the pipe I the whole is heated under pressure to the desired temperature by free steam admitted into the vessel through the pipe C and discharge D. It condenses in whole or in part until the desired temperature and pressure are reached. This temperature and pressure can be maintained by regulating the inflow of steam. After destroying the fiber and converting as much of the mineral compounds as possible I shut off the steam, open the cock of the blow-off pipe E, and I force or may force hot water into the vessel by means of the pipe H and wash the waste thoroughly therewith. I then introduce or may introduce cold water, to which a little washing-soda may be added, although it is not generally necessary. Where the waste is unvulcanized this ends the process, and the mass of reclaimed rubber is then removed and formed into sheets in the ordinary method. When, however, it is desired to devulcanize the rubber, I subject it to further treatment, as follows: Immediately after washing out the mud and before the contents of the vessel have had time to cool, I again close the cock of the blow-off pipe E and force in steam until a pressure of, say, one hundred and twenty pounds and a temperature of 338° Fahrenheit have been reached, by maintaining which for a period of from twelve to thirty-six hours the rubber will be devulcanized. This reclaiming and devulcanizing by a continuous process and at a single heat effect an enormous saving in labor and time.

In the foregoing description details have been given for the purpose of enabling those skilled in the art the better to practice the invention; but it will be understood that these have been given by way of example, and not as restricting the invention thereto, the main feature of said invention being the heating of the waste immersed in the reclaiming solution, especially a solution of hydrochloric or sulphuric acid in a close vessel under pressure above the ordinary boiling-point of such solution.

I claim as my invention or discovery—

1. The improvement in reclaiming rubber from waste, consisting in heating the waste immersed in the reclaiming solution in a close vessel under pressure above the ordinary boiling-point of such solution, substantially as described.

2. The improvement in reclaiming rubber from waste, consisting in heating the waste immersed in a solution containing for each one hundred (100) pounds of waste about fifteen to twenty-five (15 to 25) pounds of hydrochloric acid or its specified substitute in excess of the quantity requisite to combine with the decomposable mineral compounds in a close vessel under pressure to about two hundred and forty degrees Fahrenheit, (240° F.,) substantially as described.

3. The improvement in reclaiming rubber from vulcanized waste, consisting in treating the waste with a reclaiming solution, so as to corrode the fibrous matter, and then washing out the products of corrosion and steaming the rubber at a high temperature and pressure, substantially as described.

N. CHAPMAN MITCHELL.

Witnesses:
MARGARET Y. MITCHELL,
WM. H. MYERS.